Oct. 12, 1965  S. W. TEHON  3,211,931

ELECTROMECHANICAL TRANSDUCER MOTORS

Filed Dec. 10, 1962  2 Sheets-Sheet 1

END A  END B

INVENTOR:
STEPHEN W. TEHON,
BY *Marvin L. Goldenberg*
HIS ATTORNEY.

Oct. 12, 1965  S. W. TEHON  3,211,931
ELECTROMECHANICAL TRANSDUCER MOTORS
Filed Dec. 10, 1962  2 Sheets-Sheet 2
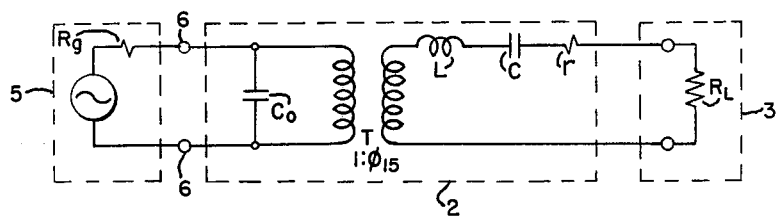
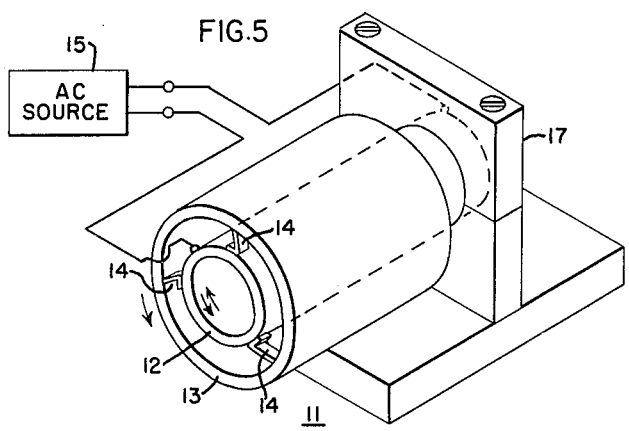
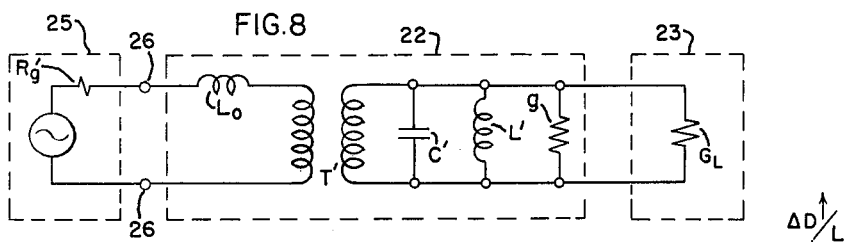
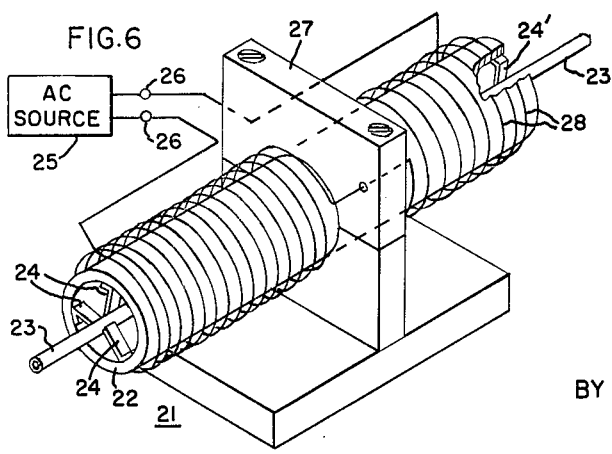
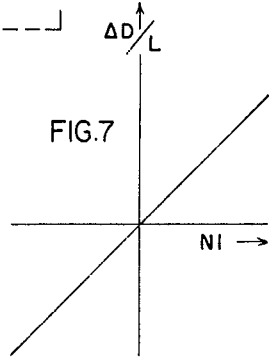
INVENTOR:
STEPHEN W. TEHON,
BY Marvin A. Goldenberg
HIS ATTORNEY.

United States Patent Office

3,211,931
Patented Oct. 12, 1965

3,211,931
ELECTROMECHANICAL TRANSDUCER MOTORS
Stephen W. Tehon, Clay, N.Y., assignor to General
Electric Company, a corporation of New York
Filed Dec. 10, 1962, Ser. No. 243,318
13 Claims. (Cl. 310—8.3)

This invention relates generally to small, relatively low power electrical motors and in particular to motors of this type which employ electromechanical transducer elements having electrostrictive or magnetostrictive characteristics for converting electrical energy to mechanical energy.

Motors of conventional type, i.e., motors which employ current conductors disposed within a changing magnetic field for producing motion, have a number of inherent limitations and have been found to be unsuitable for many applications. Because of their relatively complex construction it is difficult to build such motors of extremely small dimensions. They also normally cannot withstand wide fluctuations in ambient temperature. In addition, conventional motors are not well suited for fine mechanical positioning control since they tend to overshoot in small incremental motions. The electromechanical motors of the present invention have many characteristics which enable them to substantially overcome the above noted limitations and others present in conventional motors. In particular, the piezoelectric motors of this invention, being free of any magnetic properties, are useful in locations where magnetic field disturbance cannot be tolerated. Thus, for example, they are readily adapted for applications within electron beam vacuum tubes since their presence will not interfere with beam focusing and deflection. Outgassing from such motors, which produces undesired impurities within the vacuum, is also considerably less than from conventional motors.

It is accordingly one object of the present invention to provide a novel, extremely small size electrical motor which can be inexpensively fabricated.

Another object of the present invention is to provide a novel, small size electrical motor which can be employed for precise mechanical positioning control.

A further object of the present invention is to provide a novel, small size electrical motor which can readily withstand wide temperature variations.

A still further and more particular object of the present invention is to provide a novel, small size electrical motor which can be readily employed within an external magnetic field without disturbing said field and without having its own operation adversely affected by said field.

Briefly stated, these and other objects of the invention are accomplished by a novel electrical motor which includes an electromechanical transducer element. The transducer element may be an electrostrictive or magnetostrictive member providing a mechanical output in response to an applied electrical energization. Said member is typically provided with a cylindrical surface and in response to applied electrical energization is caused to vibrate with a torsional motion. The torsional vibratory motion is mechanically coupled to an external shaft so as to cause a unidirectional rotation of said shaft.

In accordance with one specific aspect of the invention there is provided a piezoelectric motor having a cylindrically shaped ferroelectric member and a rotatable shaft coaxially disposed therewith. The ferroelectric member, which is given an initial fixed circular polarization has a longitudinal alternating electric field applied thereto. The vector sum of the circular polarization plus an alternating longitudinally induced signal polarization of the alternating electric field is in the form of a helix having an alternating pitch. Since a ferroelectric ceramic lengthens in the direction of polarization, the member lengthens along alternate right-hand and left-hand helical paths, producing pure torsional vibrations. A supporting clamp is coupled to the ferroelectric body at a region corresponding to a node of the torsional vibrations. The motion of the torsional vibrations is integrated along one direction by mechanical directional couplers coupled between the vibrating ferroelectric body and the concentric shaft in such a manner as to cause a stepped unidirectional rotation of the shaft. The frequency of the steps of the rotational motion is equal to the frequency of the applied alternating electrical field and the distance traversed by a single step is proportional to the current supplied by said electrical field.

In accordance with a further specific aspect of the invention the motor includes a ferromagnetic member as the transducer element. The ferromagnetic member is given an initial fixed circular magnetization. An alternating magnetic field is applied in the longitudinal direction, as by a circularly wound coil, for inducing a signal magnetization in the longitudinal direction. Similar to that previously described, the vector sum of the circular magnetization plus the signal magnetization is in the form of a helix of alternating pitch producing torsional vibrations of the member, which vibrations are mechanically coupled to the rotatable shaft as before.

The features of the invention which are believed to be novel are set forth with particularity in the appended claims. The invention itself, however, both as to its organization and method of operation, together with further objects and advantages thereof, may best be understood by reference to the following description when taken in connection with the drawings, wherein:

FIGURE 4 is an electrical equivalent circuit of the piezoelectric motor of FIGURE 1;

FIGURE 5 is a perspective view of a second embodiment of a piezoelectric motor in accrodance with the invention;

FIGURE 6 is a perspective view of a magnetostrictive motor in accordance with the invention;

FIGURE 7 is a graph illustrating typical magnetostrictive properties of the ferromagnetic material employed in the motor of FIGURE 6; and FIGURE 8 is an electrical equivalent circuit of the magnetostrictive motor of FIGURE 6.

Figure 1:
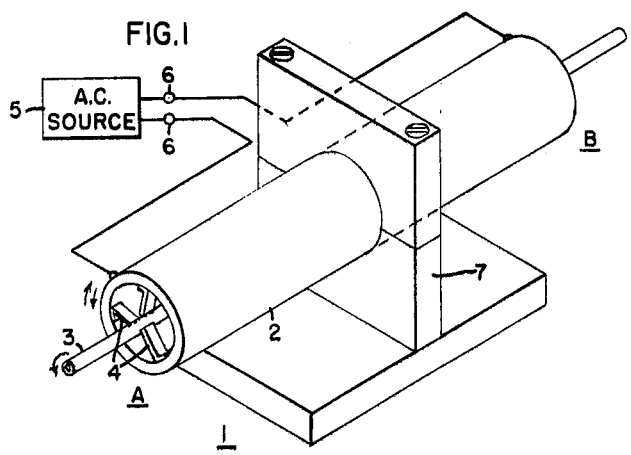
FIGURE 1 is a perspective view of one embodiment of a piezoelectric motor in accordance with the invention.

Referring now to FIGURE 1 there is shown in perspective view a torsional piezoelectric motor 1 in accordance with one embodiment of the invention. The motor 1 includes a cylindrically shaped ferroelectric ceramic member 2 having a permanent bias circular polarization set in. The ceramic member 2, being energized by a longitudinal A.-C. field, is made to drive an inner, concentrically disposed shaft 3 by means of mechanical directional couplers 4A and 4B positioned at either end of the member 2.

A source of alternating potential 5, shown in block form, is coupled by input terminals 6—6 to the end faces of cylindrical member 2 so as to apply an alternating longitudinal electric field across said member. The longitudinal electric field modifies the polarization of the member 2 so that the vector sum of the bias corcular polarization plus the alternating longitudinally induced signal polarizations is essentially in the form of a helix with alternating pitch, the pitch being proportional to the intensity of the alternating field. Effectively, the polarization the the member 2 is not appreciably changed in magnitude by the signal field but its direction is changed. The ceramic member 2 accordingly lengthens in the direction of total polarization, which is along alternate right-hand and left-hand helical paths, so as to produce a torsional vibratory motion with the ends of member 2 vibrating in opposite directions. The torsional vibrations may also be considered as caused by a shearing stress resulting from the longitudinal stress produced in response to the applied longitudinal electric field. A supporting bracket 7 is clamped to the ferroelectric member 2 at a region corresponding to the nodal ring of vibrations, which for the fundamental resonant mode is at the center of the member 2.

Figure 2:
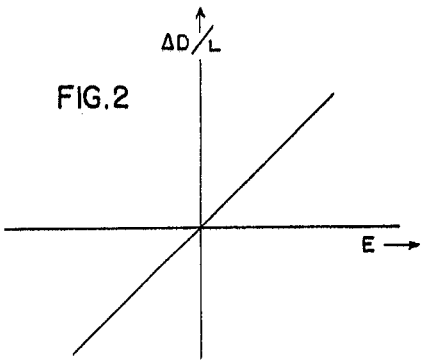
FIGURE 2 is a graph illustrating typical piezoelectric properties of the ferroelectric material employed in the motors of FIGURES 1 and 5.

It is noted that the ferroelectric member 2 is circularly polarized so as to operate on a substantially linear portion of the piezoelectric curve, as shown in FIGURE 2, in which for a no load condition $\Delta D/L$ is plotted against an applied longitudinal electric field E, where D is the displacement along the circumference of the cylinder 2 and L is the longitudinal length. $\Delta D/L$ is proportionally related to the longitudinal, shear and torsional mechanical strains of the cylinder 2. The slope of the piezoelectric curve in the operating range is proportional to the bias circular polarization so that, preferably, maximum values of bias polarization are employed. In this manner, substantial displacements having an odd-order symmetry may be provided in response to an alternating electric field, which is desirable for motor operation.

Figures 3A, 3B:
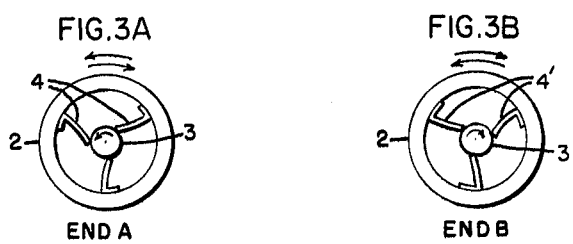
FIGURE 3A, 3B and 3C are schematic illustrations of end views of the motor of FIGURE 1.
Figure 3C:
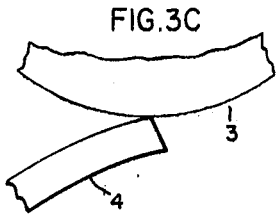

The torsional vibratory motion of the member 2 is transmitted as a unidirectional torque to shaft 3 by the mechanical directional couplers 4 and 4'. Couplers 4 and 4', typically in the form of metal ribbons, are fastened to the inside wall of member 2 and are urged in spring-like fashion against the surface of the shaft 3. Shaft 3 is fabricated of a material having surface characteristic suitable to provide a sliding-frictional contact with said mechanical couplers, depending on the direction of torsional movement of the cylinder 2. In the embodiment being considered the shaft 3 is of a glass construction and the mechanical couplers engage the surface thereof at a slightly inclined angle, as is shown in FIGURES 3A, 3B and 3C. FIGURES 3A and 3B are diagrammatic views looking into the ends A and B, respectively, of cylinder 2, and FIGURE 3C is an enlarged view of the tip of one mechanical coupler in engagement with the surface of shaft 3. Thus, the directional couplers are in frictional contact with the shaft 3 during movement of the cylinder end A in one rotational direction, shown as the counter-clockwise direction in FIGURE 3A, causing rotation of the shaft in said one direction, as indicated by the arrows. During movement of the cylinder end A in the opposite or clockwise direction, the couplers slide along the surface of the shaft 3 so that the shaft receives essentially no rotational torque in said opposite direction. In actual operation, as the end A twists in the one direction, the opposite end B twists in the opposite direction, and vice versa. Therefore, as the directional couplers 4 at end A make frictional contact with the shaft 3, the couplers 4' at end B make a sliding contact, and vice versa, providing a form of push-push motion. Accordingly, the shaft 3 is made to rotate in said one direction with a stepped motion corresponding to the vibratory motion of the cylindrical member 2.

The frequency of the torsional vibrations of the member 2 is determined by and is equal to the frequency of the applied alternating electric field. The optimum applied frequency, for maximum $\Delta D/L$ per unit applied field and therefore maximum efficiency of the motor 1, is normally close to the torsional resonant frequency "$f_o$" of the ferroelectric cylinder 2, as will be explained in greater detail presently. The optimum applied frequency hereafter will be referred to as the motor frequency. The resonant frequency, and therefore the motor frequency, varies as a function of the material and dimensions of the cylinder 2. Thus, for a cylinder of given ferroelectric material whose mean diameter "$d$" is of the same order of magnitude, or less, as the length "L," the resonant frequency is inversely related to the length so that $f_o x L = K$, a constant. As the length "L" of a cylindrical member of given ferroelectric material is altered, thereby changing the resonant frequency, the $\Delta D/L$ of the member in response to a given magnitude electric field remains unchanged. Thus $\Delta D/L$ may be said to be independent of resonant frequency. However, the total distance traversed in the rotational direction each half-cycle of vibratory motion is inversely related to the applied frequency. In addition, both $\Delta D/L$ and the total rotational distance traversed are functions of the piezoelectric characteristic of the material and the magnitude of the applied longitudinal electric field, illustrated by the curve of FIGURE 2. It follows, therefore, that the extent of the angular steps taken by the shaft 3 is a function of both the motor frequency and the magnitude of the applied field, but the angular velocity of the shaft 3 is independent of motor frequency and is a function only of the magnitude of the applied field. The above discussion has been directed primarily to a no load operation. Thus, as would be expected, the load itself is also a factor affecting the $\Delta D/L$ produced in the cylindrical member 2 and the angular velocities attained by the load, as will be seen more clearly when considering the equivalent circuit of FIGURE 4.

In a typical operation, for a cylindrical member approximately one inch in length with a mean diameter of approximately ¼ inch and a motor frequency of 100 kc., and angular velocity of shaft 3 of approximately 10 revolutions per second may be readily obtained. This corresponds to a stepped motion of $10^{-4}$ revolutions per step and to a displacement of the circumference of cylinder 2 of approximately $80\mu$ inches per step.

Since the shaft does move in a fine stepped sequence and since the length of the steps is a function of the applied frequency, it may be appreciated that the motors of the present invention are well suited for precise mechanical positioning control applications. In addition, moderately high speeds can be attained.

The ferroelectric ceramic member 2 may be composed of a number of ferroelectric materials. The principal characteristics of the materials are: (1) high electromechanical coupling coefficient $k_{15}$, preferably on the order of .5 or better; (2) high dielectric constant, e.g., 1000 or more; (3) moderately high mechanical Q, e.g., 100 or above; (4) high mechanical stress levels, about 500 p.s.i. and above; and (5) high mechanical strains, on the order of $10^{-4}$. Ferroelectric ceramic materials having such characteristics include barium titanate, lead zirconate-titanate and lead metaniobate. One particularly good material has been found to be barium titanate having a cobalt additive. The temperature range of operation of these materials is limited only by their Curie temperature, which is relatively high.

The member 2 may be circularly polarized in known fashion by first heating the member and then energizing a pair of longitudinal electrodes positioned in parallel and coupled to a segment of the surface of the cylinder. A transverse field is thus applied to the limited surface of the cylinder located between the electrodes. By rotating the cylinder with respect to the electrodes successively different portions of the surface are positioned between the electrodes, resulting in circular polarization of the cylinder. Polarization is retained during this rotation provided the cylinder temperature remains below its Curie point.

An equivalent circuit of the piezoelectric motor 1 is shown in FIGURE 4. It is seen that the source 5, including an internal resistance $R_g$, is coupled to the input terminals 6—6. Across the input terminals 6—6 is coupled a clamped capacitance $C_o$, which represents the electrical capacitance of the cylindrical member 2. In parallel with $C_0$ is an ideal transformer T which indicates the conversion of electrical energy to mechanical energy, the turns ratio of transformer T being given as $1:\phi_{15}$. Connected to the secondary winding of the transformer T is a circuit representing in electrical symbols the mechanical properties of the vibrating cylindrical member 2 and the shaft 3. The circuit includes the series connection of an inductance L, a capacitance C, a resistance $r$ and a load resistance $R_L$. L represents the effects of rotary inertia in member 2; C represents the mechanical compliance of member 2; $r$ represents the viscous damping of member 2; and $R_L$ represents the viscous damping of the load. It is noted that the values of L and C determine the resonant frequency of vibration of member 2.

The electromechanical coupling coefficient $k_{15}$ which is essentially a measure of the percentage of input electrical energy converted into mechanical energy, may be expressed as $$k_{15} \sim \sqrt{\phi_{15}^2 \, C/C_o}$$

It is desirable that the ratio of $$\phi_{15}^2 \, C/C_o$$

be made as high as possible for providing high load current $I_L$.

Referring again to FIGURE 2, the relationship of the $\Delta D/L$ to the applied electric field for a no load condition is illustrated. This relationship will change however for applied loads so that for a given load a greater applied field is required to obtain the same $\Delta D/L$ as with no load. Thus, it is more directly the load current $I_L$ rather than the applied electric field that determines $\Delta D/L$ and the angular velocity of the shaft 3. Accordingly, the mechanical output power may be expressed as $I_L^2 \times R_L$. The power may also be shown to be proportional to the square of the angular velocity of the shaft 3. The maximum power delivered to the load is determined by the proper impedance match between the impedance of source 5 and that of the loaded vibrating piezoelectric member. It may be readily seen from FIGURE 4 that for maximum delivered power the frequency of operation, i.e., the motor frequency, will be normally slightly higher than the resonant frequency of member 2.

In addition, for a given applied potential, $R_L$ and $I_L$ are inversely related. Thus, for a no load condition $I_L$ is maximum. This is an advantageous characteristic of the piezoelectric motor since it means that high starting torques can be generated. In addition, when designed for safe no load operation, the motor can be made to be burnout proof.

Referring now to FIGURE 5, there is illustrated an alternative embodiment of the piezoelectric motor of the invention wherein a cylindrically shaped ferroelectric member 12 drives an outer cylindrical shaft member 13. The motor 11, being energized by A.C. source 15 is otherwise similar in construction and operation to the motor illustrated in FIGURE 1. Mechanical directional couplers 14 are fastened to the outside wall of ferroelectric member 12 at one end thereof, making a sliding-frictional contact with the inside wall of shaft 13. A supporting bracket 17 is clamped to the opposite end of the member 12, which is now a node of vibratory motion. Said one end, to which are fastened the directional couplers 14, exhibits maximum torsional vibrations. Accordingly, the cylindrical shaft 13 is driven with a stepped rotational motion in response to an applied electric field similar to the manner previously described with respect to the motor of FIGURE 1.

FIGURE 6 illustrates in perspective view a torsional magnetostrictive motor 21 which is a still further embodiment of the invention. Motor 21 operates in accordance with principles of magnetization rather than polarization. Other than this difference, it will be recognized that motor 21 has great similarity both in construction and operation to the motor illustrated in FIGURE 1. In FIGURE 6 there is employed a ferromagnetic cylindrically shaped member 22, which may be, e.g., a ferrite material. In response to a combined circular and longitudinal magnetizing field, member 22 vibrates with a torsional motion for driving a shaft 23 by means of mechanical directional couplers 24 and 24'. The shaft 23, directional couplers 24 and 24' and supporting bracket 27 may be identical to corresponding components illustrated in FIGURE 1.

A permanent circular bias polarization is initially established in the member 22. This may be readily accomplished by passing a current in the longitudinal direction through the hollow of the member 22 in a manner not illustrated. A source of A.-C. current 25 is coupled through input terminals 26—26 to a solenoid 28 wound about the member 22 throughout its length for providing an alternating longitudinal magnetic field. The longitudinal magnetic field modifies the magnetization of the member 22 so that the vector sum of the bias circular magnetization plus the alternating longitudinally induced signal magnetizations is in the form of a helix with alternating pitch, comparable to the polarization characteristic described with respect to the motor of FIGURE 1. The ferromagnetic member 22 accordingly lengthens in the direction of magnetization for producing torsional vibratory motion. The ferromagnetic member 22 is circularly magnetized so as to operate on a substantially linear portion of the magnetostrictive curve, as shown in FIGURE 7, in which $\Delta D/L$ is plotted against an applied longitudinal magnetic field, expressed as NI. The operation of the motor 21 with respect to driving a load, in this instance shaft 23, is otherwise the same as that of FIGURE 1 and need not be further described.

As an alternative arrangement, rather than setting in a permanent circular magnetization, a circular magnetic field may be readily applied to member 22 together with the longitudinal magnetic field. For such operation it may be recognized that the circular field must be applied slightly in advance of the longitudinal field.

In FIGURE 8 there is shown an equivalent circuit of the motor of FIGURE 6, which is the dual of the circuit shown in FIGURE 4. Accordingly, $L_O$, representing the compliant inductance, is connected in series between the input terminals 26—26 and the primary winding of an ideal electrical to mechanical conversion transformer T'. Connected to the secondary winding of the transformer T' are the mechanical properties of the member 22 and shaft 23 expressed in electrical symbols, including a parallel resonant capacitance C' and an inductance L' connected in shunt with a conductance $g$ and a load conductance $G_L$. The considerations presented with respect to the circuit of FIGURE 4 apply in like fashion to the circuit of FIGURE 8.

Although the invention has been described with respect to a specific embodiment for purposes of clarity and completeness of invention, it may be appreciated that numerous modifications may occur to those skilled in the art which do not exceed the basic teaching set forth. Accordingly, one such modification may provide for simultaneously driving a load which includes both an inner shaft and an outer cylindrical shaft. In addition, a plurality of vibrating members may be coupled to drive a single load. Further, although the vibrating members have been shown to have a cylindrical configuration they may assume other structural forms, e.g., have the shape if a polyhedron. It is also contemplated that in some applications it may be desirable to employ a ratchet arrangement for driving a load wherein the surface of the driven shaft is provided with serrations spaced apart by a distance corresponding to the distance traversed by the sliding tip of the mechanical couplers during a half cycle of vibrations. Thus, the couplers will alternately slide and lock on during successive half cycles as they advance along the serrated surface.

The appended claims are intended to include all modifications falling within the true scope and spirit of the invention.

What I claim as new and desire to secure by Letters Patent of the United States is:

1. A motor comprising:
   (a) an electromechanical transducer means for providing a mechanical output in response to an applied electrical energization,
   (b) input means applying said electrical energization to said transducer means for producing torsional vibrations therein,
   (c) rotatable means coaxially disposed with said transducer means, and
   (d) mechanical directional coupling means extending between said transducer means and said rotatable means so as to be fixedly coupled to one and movably coupled to the other for translating the vibratory motion of said transducer means into a unidirectional rotation of said rotatable means.

2. A motor as in claim 1 wherein a supporting clamp is coupled to the transducer means at a region corresponding to a node of said torsional vibrations.

3. A motor as in claim 2 wherein said mechanical directional coupling means includes at least one leg fastened to said transducer means and making a sliding-frictional contact with a surface of said rotatable means so that motion of said leg in one direction along said surface provides a frictional contact and motion in the opposite direction provides a relatively frictionless contact, whereby torque is transmitted in said one direction from said transducer means to said rotatable means.

4. A motor as in claim 3 wherein said transducer means is a cylindrically shaped member and said rotatable means is a shaft concentrically mounted within said member.

5. A motor as in claim 3 wherein said transducer means is a cylindrically shaped member and said rotatable means is a cylindrical shaft coaxially disposed about said member.

6. A piezoelectric motor comprising:
   (a) a piezoelectric member provided with a bias closed path polarization,
   (b) means applying an alternating electric field to said member in a direction approximately orthogonal to said closed path polarization for exciting torsional vibrations therein,
   (c) rotatable means coaxially disposed with said piezoelectric member, and
   (d) mechanical directional coupling means for translating the vibratory motion of said piezoelectric member into a unidirectional rotation of said rotatable means.

7. A piezoelectric motor as in claim 6 wherein a supporting clamp is coupled to the piezoelectric member at a region corresponding to a node of said torsional vibrations.

8. A piezoelectric motor as in claim 7 wherein said mechanical directional coupling means includes a plurality of legs fastened to said piezoelectric member and making a sliding-frictional contact with a surface of said rotatable means so that motion of said legs in one direction along said surface provides a frictional contact and motion in the opposite direction provides a relatively frictionless contact, whereby torque is transmitted in said one direction from said vibrating piezoelectric member to said rotatable means.

9. A piezoelectric motor as in claim 8 wherein said piezoelectric member has a cylindrical configuration and said rotatable means is a shaft concentrically mounted within said member.

10. A piezoelectric motor as in claim 8 wherein said piezoelectric member has a cylindrical configuration and said rotatable means is a cylindrical shaft coaxially disposed about said member.

11. A magnetostrictive motor comprising:
    (a) a magnetostrictive member having a cylindrical surface and being provided with a circular magnetization,
    (b) means applying an alternating magnetic field to said member in the longitudinal direction for exciting torsional vibrations therein,
    (c) rotatable means coaxially disposed with said magnetostrictive member, and
    (d) mechanical directional coupling means for translating the vibratory motion of said magnetostrictive member into a unidirectional rotation of said rotatable means.

12. A magnetostrictive motor as in claim 11 wherein said mechanical directional coupling means includes a plurality of legs fastened to said magnetostrictive member and making a sliding-frictional contact with the surface of said rotatable means so that motion of said legs in one direction along said surface provides a frictional contact and motion in the opposite direction provides a relatively frictionless contact, whereby torque is transmitted in said one direction from said vibrating magnetostrictive member to said rotatable means.

13. A magnetostrictive motor as in claim 12 wherein said rotatable means is a shaft concentrically mounted within said member.

References Cited by the Examiner

UNITED STATES PATENTS

| | | | |
|---|---|---|---|
| 1,804,838 | 5/31 | Meissner | 310—8.5 |
| 2,439,499 | 4/48 | Williams et al. | 310—8.6 |
| 2,497,108 | 2/50 | Williams | 310—8 |
| 2,669,666 | 2/54 | Mason et al. | 310—8 |
| 2,838,696 | 6/58 | Thurston | 310—8.5 |
| 3,058,218 | 10/62 | Kleesattel et al. | 310—26 |

ORIS L. RADER, *Primary Examiner.*

MILTON O. HIRSHFIELD, *Examiner.*